United States Patent [19]

Tsujimura et al.

[11] Patent Number: 4,844,666
[45] Date of Patent: Jul. 4, 1989

[54] INSERT ROTARY CUTTING TOOL

[75] Inventors: Osamu Tsujimura, Kawasaki; Tatsuo Arai, Kitamoto; Nobuo Hiyama, Utsunomiya, all of Japan

[73] Assignees: Izumo Industrial Co., Ltd., Tokyo; Mitsubishi Kinzoku Kabushiki Kaisha, Tochigi, both of Japan

[21] Appl. No.: 87,104

[22] Filed: Aug. 19, 1987

[30] Foreign Application Priority Data

Aug. 22, 1986 [JP] Japan .................. 61-196776
Oct. 7, 1986 [JP] Japan .................. 61-238798

[51] Int. Cl.⁴ .................................... B26D 1/00
[52] U.S. Cl. ............................. 407/34; 407/53; 407/59; 407/62
[58] Field of Search ............. 407/34, 35, 53, 54, 407/55, 56, 58, 59, 60, 61, 62, 63

[56] References Cited

U.S. PATENT DOCUMENTS

| | | | |
|---|---|---|---|
| 1,948,057 | 2/1934 | Tscherne | 407/59 |
| 3,157,938 | 11/1964 | Sabbewal | 407/61 |
| 4,093,392 | 6/1978 | Hopkins | 407/59 |
| 4,182,587 | 6/1980 | Striegl | 407/61 |
| 4,519,731 | 5/1985 | Jester | 407/56 |
| 4,586,855 | 5/1986 | Rawle | 407/61 |

FOREIGN PATENT DOCUMENTS

| | | |
|---|---|---|
| 30-3897 | 6/1955 | Japan . |
| 30-5244 | 7/1955 | Japan . |
| 0631271 | 11/1978 | U.S.S.R. .................. 407/61 |

OTHER PUBLICATIONS

"Milling and Design of Milling Cutters" published by Ohkouchi Shuppan, 4th Edition, 1969, pp. 145 and 146.

Primary Examiner—Frederick R. Schmidt
Assistant Examiner—Blynn Shideler
Attorney, Agent, or Firm—Scully, Scott Murphy & Presser

[57] ABSTRACT

An insert rotary cutting tool includes a tool body of a generally circular cross-section having an axis of rotation therethrough and having an outer periphery. The cutting tool has plural groups of cutting inserts releasably mounted on the outer periphery of the body with the groups being spaced circumferentially of the body from each other. The inserts of each group are displaced circumferentially of the body and spaced axially of the body. Each of the inserts has a plurality of main cutting edges and is disposed in such a manner that one of the main cutting edges is indexed in a peripheral cutting position to serve as a peripheral cutting edge. The indexed peripheral cutting edges of the inserts are in series axially of the body as viewed circumferentially of the body. The indexed peripheral cutting edges of the inserts of each group have foremost ends disposed on a common helical line extending helically axially of the body. The helical line which the foremost ends of the indexed peripheral cutting edges of the inserts of at least one of the groups are disposed on is provided with a helix angle different from helix angles of the helical lines which the foremost ends of the indexed peripheral cutting edges of the inserts of the other groups are disposed on.

6 Claims, 5 Drawing Sheets

INSERT ROTARY CUTTING TOOL

BACKGROUND OF THE INVENTION

1. Field of the Invention

The present invention relates to an insert rotary cutting tool having plural groups of indexable cutting inserts mounted on an outer periphery of a tool body in circumferentially spaced relation to each other with the inserts of each group being displaced circumferentially of the body and spaced axially of the body.

2. Prior Art

One conventional rotary cutting tool includes an end mill as shown in FIGS. 1 to 3. The end mill comprises a generally cylindrical tool body 100 adapted to be rotated in the direction of the arrow R about an axis O therethrough. The body 100 has a plurality of axially extending slots 102 formed in an outer periphery at its forward end 104 in circumferentially spaced relation to one another, the slots 102 opening to a forward end face of the body 100. Each of the slots 102 has a circumferentially facing wall surface 106 sloping in the circumferential direction opposite to that of rotation of the body 100 away from the forward end face. Formed in each wall surface 106 are a plurality of recesses 108 each opening to the outer periphery of the body 100, those foremost recesses disposed closest to the forward end face of the body 100 also opening to the forward end face. The recesses 108 formed in each slot 102 have respective bottom faces disposed on a plane generally parallel to a respective one of the wall surfaces 106. An indexable cutter insert 110 is received in each recess 108 and fixed in place by a clamp screw 112.

Each insert 110 comprises a quadrilateral plate made of hard wear resistant material such as cemented carbide. Each insert 110 has four main cutting edges formed on four marginal ridges of its front face, and is disposed in such a manner that one of the main cutting edges thereof is indexed in its peripheral cutting position to serve as a peripheral cutting edge 114, and that one of the other main cutting edges of that insert received in each foremost recess is indexed in its end cutting position to serve as an end cutting edge 116. The inserts are also disposed in overlapping relation when the body 100 is viewed in the circumferential direction, so that the peripheral cutting edges 114 of the inserts 110 are disposed continuously in the axial direction.

With this construction, plural groups of the inserts 110 are disposed in the slots 102, respectively, and the peripheral cutting edges 114 of the inserts 110 of each group are disposed on a respective one of a plurality of lines H extending axially helically of the body 100 with equal helix angles $\theta$ so as to slope in the circumferential direction opposite to that of rotation of the body 100 away from the forward end face. As a result, the respective inserts of each group engage a workpiece one by one and disengage therefrom one by one as the body 100 rotates. Accordingly, cutting loads exerted on the body 100 do not vary abruptly, and therefore the body 100 is prevented from severe vibration during cutting operation.

The prior art end mill, however, has the drawback that it has still been susceptible to a small vibration during cutting operation. Hence, the peripheral cutting edges 114 of the inserts 110 have been susceptible to chipping, and besides the finished surface of the workpiece cut by the end cutting edges 116 has been adversely affected by the vibration. Accordingly, the end mill has not been successfully employed when required to obtain extremely smooth surface finish or when carrying out heavy-duty cutting operation such as deep cutting and high feed cutting.

SUMMARY OF THE INVENTION

It is therefore an object of the present invention to provide an improved insert rotary cutting tool which is hardly subjected to even a small vibration, to thereby permit excellent surface finish to be obtained, and which can be successfully employed for heavy-duty cutting operation.

According to the present invention, there is provided an insert rotary cutting tool comprising a tool body of a generally circular cross-section having an axis of rotation therethrough and having an outer periphery, and plural groups of cutting inserts releasably mounted on the outer periphery of the body with the groups being spaced circumferentially of the body from each other, the inserts of each group being displaced circumferentially of the body and spaced axially of the body, each of the inserts having a plurality of main cutting edges and being disposed in such a manner that one of the main cutting edges is indexed in a peripheral cutting position to serve as an peripheral cutting edge, the indexed peripheral cutting edges of the inserts being in series axially of the body as viewed circumferentially of the body, the indexed peripheral cutting edges of the inserts of each group having foremost ends disposed on a common helical line extending helically axially of the body, the helical line which the foremost ends of the indexed peripheral cutting edges of the inserts of at least one of the groups are disposed on being provided with a helix angle different from helix angles of the helical lines which the foremost ends of the indexed peripheral cutting edges of the inserts of the other groups are disposed on.

DESCRIPTION OF PREFERRED EMBODIMENTS OF THE INVENTION

Figure 1:
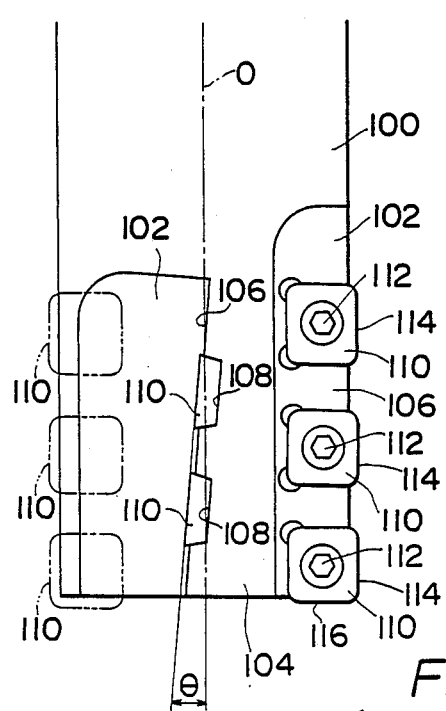
FIG. 1 is a front-elevational view of a conventional rotary cutting tool.
Figure 2:
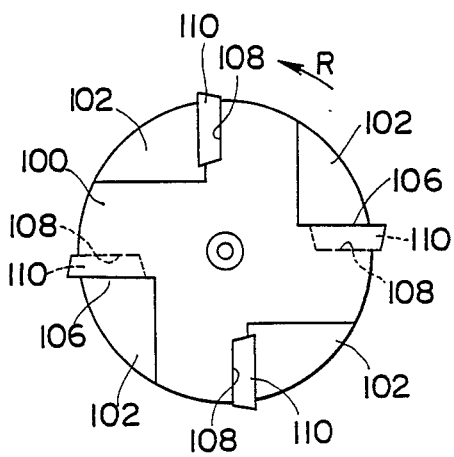
FIG. 2 is an end view of the cutting tool of FIG. 1.
Figure 3:
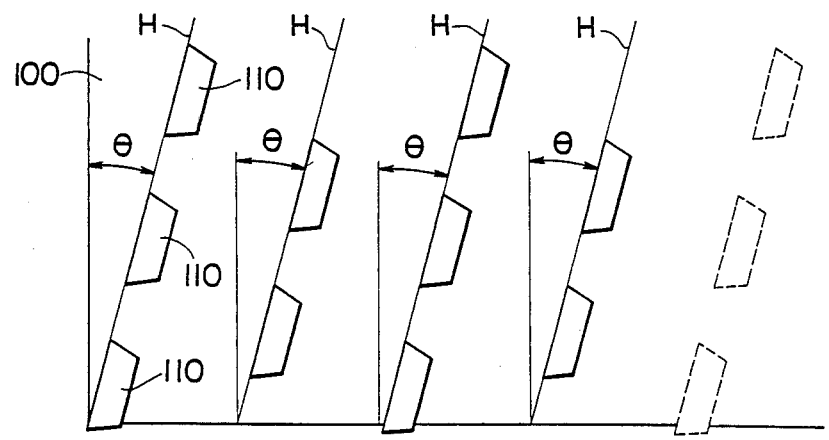
FIG. 3 is a schematic development view of the cutting tool of FIG. 1, showing the disposition of cutter inserts attached thereto.

Various embodiments of the present invention will now be described with reference to the accompanying drawings in which like reference characters denote corresponding parts in several views.

Figure 4:
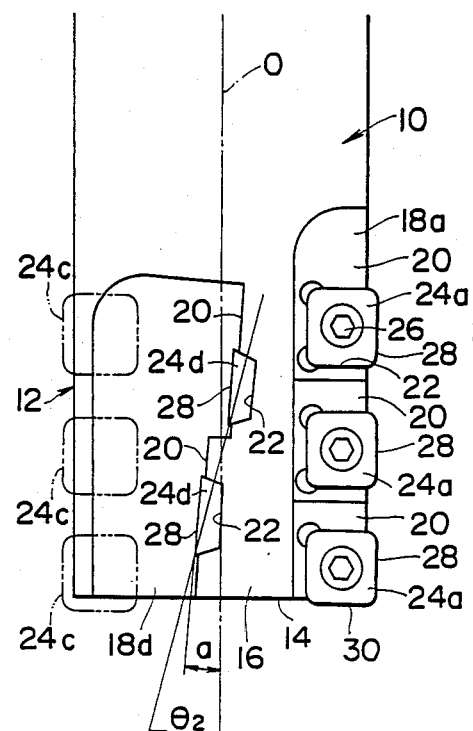
FIG. 4 is a view similar to FIG. 1, but showing a rotary cutting tool in accordance with the present invention.
Figure 5:
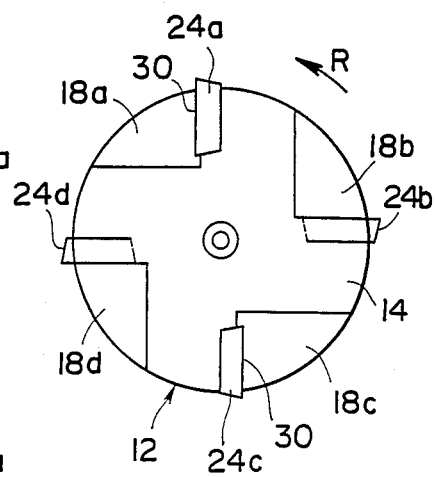
FIG. 5 is a view similar to FIG. 2, but showing the cutting tool of FIG. 4.
Figure 6:
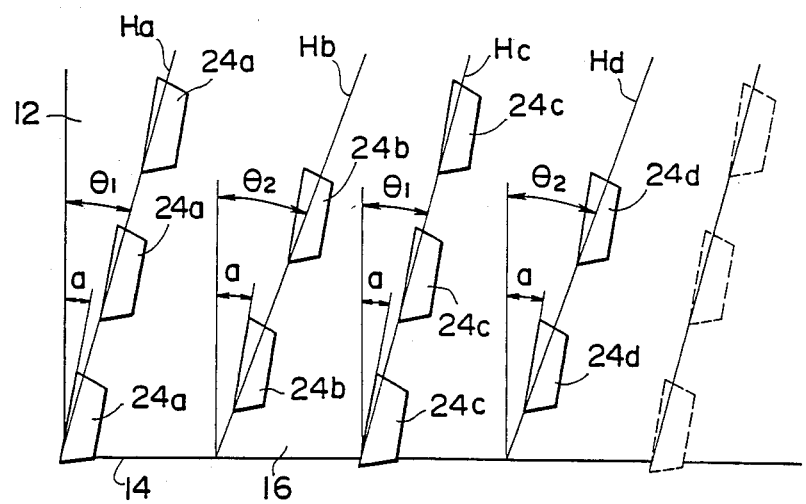
FIG. 6 is a view similar to FIG. 3, but showing the cutting tool of FIG. 4.

Referring to FIGS. 4 to 6, an insert helical end mill in accordance with one embodiment of the present invention comprises a generally cylindrical tool body 10 including a forward portion 12 and a rearward portion, the rearward portion being adapted to be fixedly secured to a machine spindle so that the body 10 can be rotated in the direction of the arrow R about an axis O therethrough. The forward portion 12, which has a forward end face 14 and a circumferential surface 16, includes four axially extending slots 18a, 18b, 18c and 18d formed in its circumferential surface 16, the slots 18a to 18d being equally spaced circumferentially of the body 12 at its forward end. The two slots 18a and 18c disposed in diametrically opposite relation have three circumferentially facing wall surfaces 20, respectively, while the other two slots 18b and 18d have two such wall surfaces 20. The wall surfaces 20 are sloping in the circumferential direction opposite to that of rotation of the body 10 away from the forward end face 14, respectively, and are displaced axially of the body 10 from each other, the wall surface disposed closer to the rearward portion of the body 10 being stepped in the direction opposite to that of rotation of the body 10 from the wall surface disposed closer to the forward end face 14 of the body 10. Formed in each wall surface 20 is a recess 22 opening to the circumferential surface 16 of the forward end 12, those foremost recesses of the two slots 18a and 18c disposed closest to the forward end face 14 of the body 10 also opening to the forward end face 14. Each recess 22 has a bottom face parallel to a respective one of the wall surfaces 20 of each of the slots 18a to 18d. Four groups of indexable cutting inserts 24a to 24d of identical shape and size are releasably mounted in the recesses 22 of the four slots 18a to 18d, respectively.

Each of the inserts 24a to 24d comprises a generally quadrilateral plate defined by a front face, a rear face disposed generally parallel to the front face, and four side faces. The insert has four main cutting edges each defined by the intersection of the front face to a respective one of the side faces. Those portions of the front face disposed adjacent and extending along the main cutting edges serve as respective rake surfaces for the main cutting edges. Each of the side faces is sloping inwardly in a direction away from the front face, and is serving as a flank for a respective one of the main cutting edges. Each insert is disposed in a respective one of the recesses 22 with the rear face resting on the bottom face thereof, and fixed in place by suitable clamp means such as a clamp screw 26. One of the main cutting edges of each insert is indexed in its peripheral cutting position to serve as a peripheral cutting edge 28 while the foremost main cutting edge of each insert disposed in a respective one of the foremost recesses 22 in the two slots 18a and 18c is indexed in its end cutting position to serve as an end cutting edge 30. The peripheral cutting edges 28 of the inserts 18a to 18d are disposed in series axially of the body 10 as viewed in the circumferential direction, so as to be brought into alignment with and pass through a common line generally parallel to the axis O of the body 10 when the body 10 is rotated during cutting operation. The end cutting edges 30 are disposed substantially in a common plane perpendicular to the axis O of the body 10.

Further, the inserts 24a, 24c disposed in the recesses 22 of each of the two slots 18a and 18c are arranged in such a manner that the indexed peripheral cutting edges 28 thereof have foremost ends disposed on a common helical line $H_a$, $H_c$ extending helically axially of the body 10 with a prescribed equal helix angle $\theta_1$ while the inserts 24b, 24d disposed in the recesses 22 of each of the other two slots 18b and 18d are arranged in such a manner that the indexed peripheral cutting edges 28 thereof have foremost ends disposed on a common helical line $H_b$, $H_d$ extending helically axially of the body 10 with a prescribed equal helix angle $\theta_2$ larger than the above helix angle $\theta_1$. The indexed peripheral cutting edges 28 of all the inserts 24a to 24d are provided with an equal positive axial rake angle a, the rake angle a being smaller than the helix angles $\theta_1$ and $\theta_2$ of the helical lines $H_a$, $H_c$ and $H_b$, $H_d$.

In the end mill described above, the helix angle $\theta_1$ of the helical lines $H_a$ and $H_c$, which the foremost ends of the indexed peripheral cutting edges 28 of the two groups of the inserts 24a and 24c are respectively disposed on, is selected to be smaller than the helix angle $\theta_2$ of the helical lines $H_b$ and $H_d$, which the foremost ends of the indexed peripheral cutting edges 28 of the other two groups of the inserts 24b and 24d are respectively disposed on. Consequently, the circumferential distance between the adjacent two helical lines $H_a$ and $H_b$ and the circumferential distance between the adjacent two helical lines $H_c$ and $H_d$ are increased gradually from the forward end of the body 10 toward the rearward portion while the circumferential distance between the adjacent two helical lines $H_b$ and $H_c$ and the circumferential distance between the adjacent two helical lines $H_d$ and $H_a$ are decreased gradually. Accordingly, although vibrations might be induced by the respective groups of the inserts during cutting operation, the frequency of the vibration induced by the two groups of the inserts 24a and 24c would be different from that of the vibration induced by the other two groups of the inserts 24b and 24d, and therefore the both vibrations would be cancelled by each other. In addition, the vibrations induced by the inserts 24a to 24d would be irregular in the axial direction of the body 10. Accordingly, the end mill is prevented from being subjected to such a vibration as to cause a resonance with a machine tool, thereby preventing the end mill from being subjected to chattering. As a result, the indexed peripheral cutting edges of the inserts are prevented from chipping, and besides an excellent surface finish can be obtained. Therefore, the end mill can be employed successfully when required to obtain extremely smooth surface finish or when carrying out heavy-duty cutting operation such as deep cutting and high feed cutting.

In the foregoing, in order to prevent chattering of the end mill more definitely, the difference between the helix angles $\theta_1$ and $\theta_2$ should be selected as great as possible. However, if the difference becomes too excessive, the circumferential distance between the helical lines $H_b$ and $H_c$ and the circumferential distance between the helical lines $H_d$ and $H_a$ are respectively decreased unduly at their rearward ends, resulting in difficulty in chip removing. Accordingly, the inserts 24a to 24d have to be disposed so that the difference between the helix angles $\theta_1$ and $\theta_2$ becomes optimum. For example, for the end mill having a diameter D of about 32 mm and a length L of cut not greater than 2D, the helix angles $\theta_1$ and $\theta_2$ be preferably selected so as to satisfy the following relationship:

$$\theta_1 - \theta_2 = 1° \text{ to } 10°$$

Figure 7:
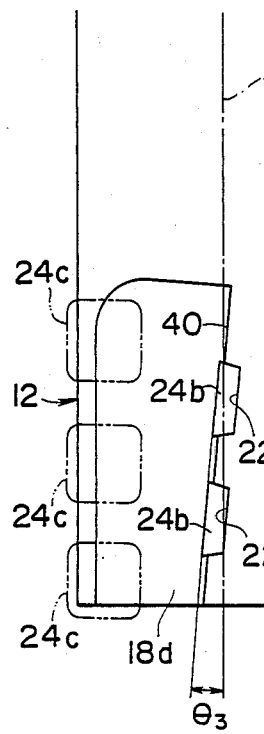
FIG. 7 is a view similar to FIG. 1, but showing a modified rotary cutting tool in accordance with the present invention.
Figure 8:
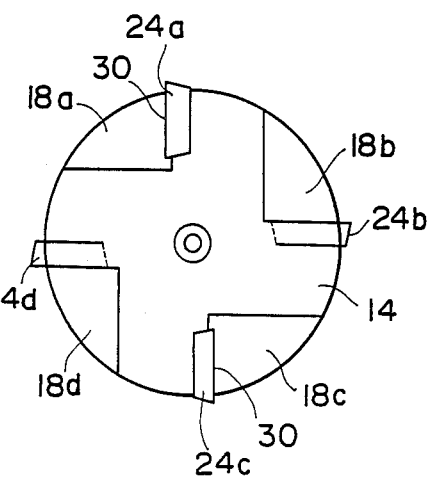
FIG. 8 is a view similar to FIG. 2, but showing the cutting tool of FIG. 7.
Figure 9:
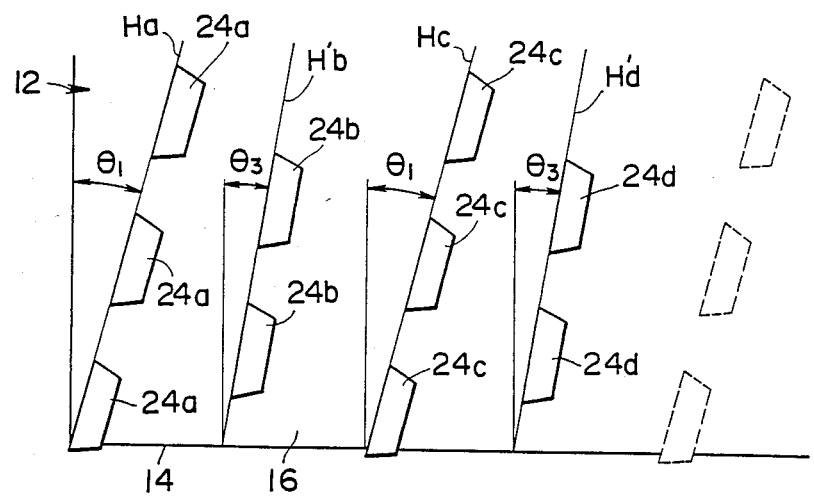
FIG. 9 is a view similar to FIG. 3, but showing the cutting tool of FIG. 7.

FIGS. 7 to 9 show a modified end mill in accordance with the present invention which differs from the aforementioned embodiment in that the two groups of the inserts 24b and 24d are respectively disposed along the helical lines $H'_b$ and $H'_d$ having an equal helix angle $\theta_3$ smaller than the helix angle $\theta_1$ of the helical lines $H_a$ and $H_c$. Further, in this embodiment, each of the slots 18a to 18d has a single circumferentially facing wall surface 40 sloping in the circumferential direction opposite to that of rotation of the body 10 away from the forward end face 14, and the recesses 22 are formed in each wall surface 40 so that the bottom face of each recess is parallel to the wall surface. Thus, the indexed peripheral cutting edges of the inserts of the respective groups have the same axial rake angles as the helix angles $\theta_1$ and $\theta_3$ of the helical lines, respectively.

Figure 10:
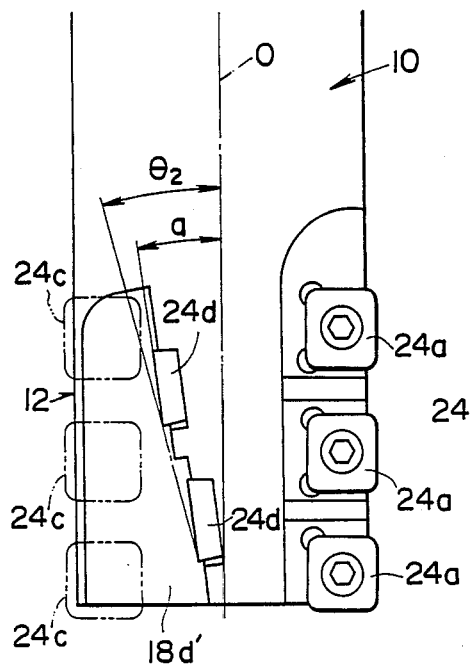
FIG. 10 is a view similar to FIG. 1, but showing another modified rotary cutting tool in accordance with the present invention.
Figure 11:
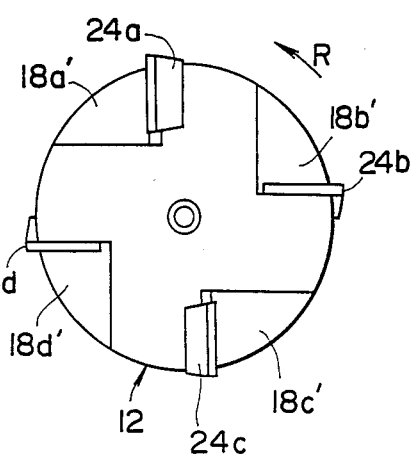
FIG. 11 is a view similar to FIG. 2, but showing the cutting tool of FIG. 10.
Figure 12:
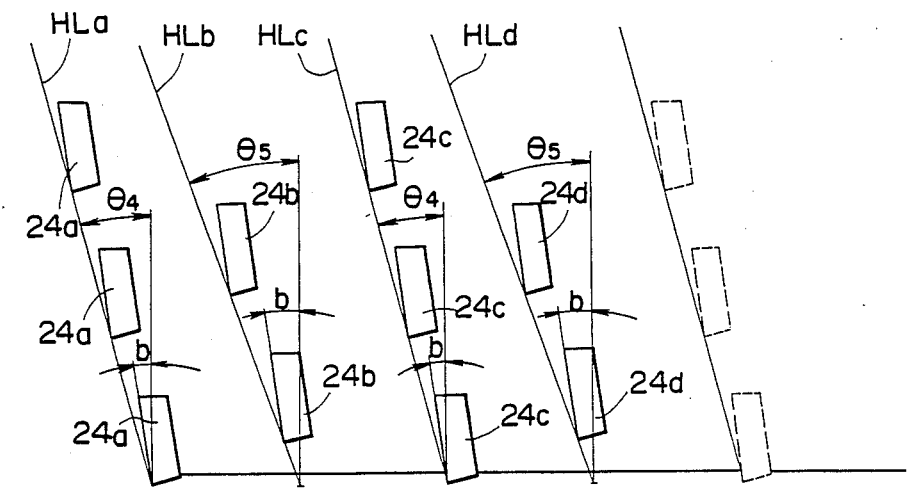
FIG. 12 is a view similar to FIG. 3, but showing the cutting tool of FIG. 10.

FIGS. 10 to 12 show another modified end mill in accordance with the present invention which differs from the embodiment of FIGS. 4 to 6 in that the inserts 24a, 24b, 24c or 24d of each group are disposed in such a manner that the indexed peripheral cutting edges thereof have foremost ends disposed on a common helical line $HL_a$, $HL_b$, $HL_c$ or $HL_d$ sloping in the direction of rotation of the body away from the forward end face of the body, the helical line $HL_a$, $HL_c$ having a helix angle $\theta_4$ while the helical line $HL_b$, $HL_d$ has a helix angle $\theta_5$ larger than the helix angle $\theta_4$. In this embodiment, the indexed peripheral cutting edges of all the inserts are provided with an equal negative axial rake angle b.

Figure 13:
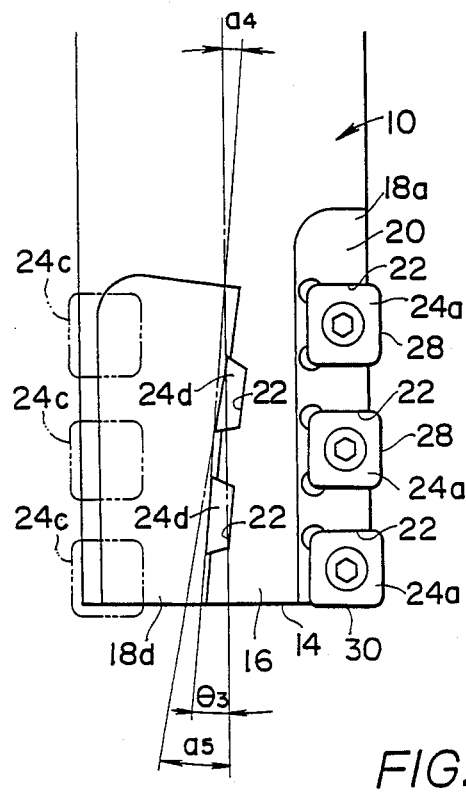
FIG. 13 is a view similar to FIG. 1, but showing a further modified rotary cutting tool in accordance with the present invention.
Figure 14:
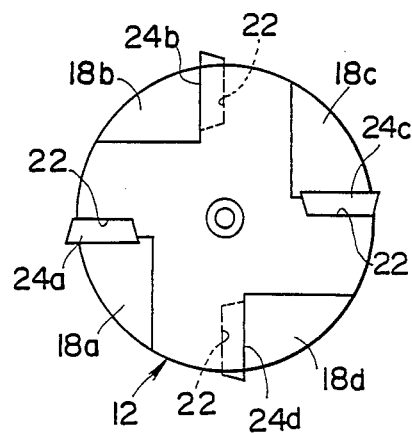
FIG. 14 is a view similar to FIG. 2, but showing the cutting tool of FIG. 13.
Figure 15:
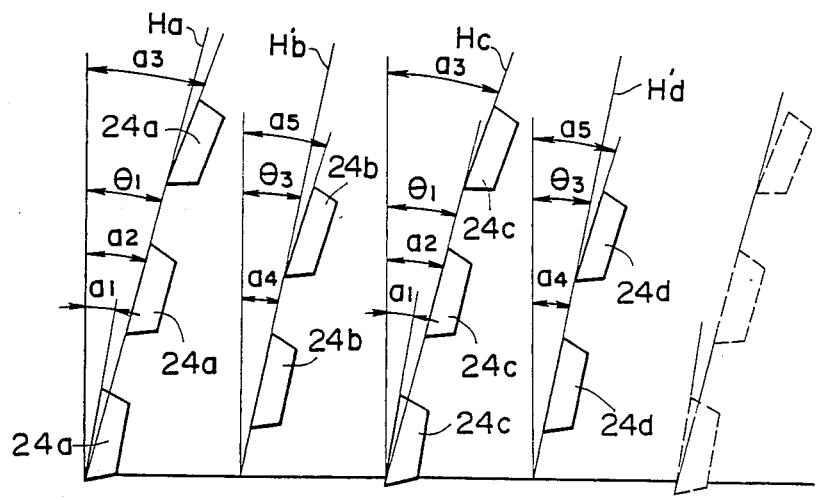
FIG. 15 is a view similar to FIG. 3, but showing the cutting tool of FIG. 13.

FIGS. 13 to 14 show a further modified end mill in accordance with the present invention which differs from the aforementioned embodiment of FIGS. 7 to 9 in that the inserts of each group have axial rake angles different from each other. Namely, with respect to each group of the three inserts 24a, 24c, the indexed peripheral cutting edge 28 of the foremost insert disposed closest to the forward end face 14 has an axial rake angle $a_1$ smaller than an axial rake angle $a_2$ of the indexed peripheral cutting edge of the intermediate insert while the indexed peripheral cutting edge of the rear insert has an axial rake angle $a_3$ larger than the axial rake angle $a_2$ of the indexed peripheral cutting edge of the intermediate insert, the axial rake angle $a_2$ for the indexed peripheral cutting edge of the intermediate insert being equal to the helix angle $\theta_1$ of the helical lines $H_a$ and $H_c$. Further, with respect to each group of the two inserts 24b, the front insert has an axial rake angle $a_4$ which is the same as the helix angle $\theta_3$ of the helical lines $H'_b$ and $H'_d$ while the rear insert has an axial rake angle $a_5$ greater than the axial rake angle $a_4$. Thus, in addition to the different helix angles of helical lines $H_a$, $H'_b$, $H_c$ and $H'_d$, the indexed peripheral cutting edges 28 of the inserts 24a to 24d have different axial rake angles $a_1$ to $a_5$. Accordingly, the respective peripheral cutting edges are subjected to cutting loads exerted in different directions for different time intervals. Accordingly, the end mill is prevented from being subjected to chattering more definitely. In addition, in this embodiment, the axial rake angle of that insert disposed closer to the rearward portion of the body 10 is larger than the axial rake angle of the insert disposed closer to the forward end face 14 of the body 10. As a result, the indexed peripheral cutting edge of the insert has longer circumferential length, and is subjected to cutting for longer duration of time, so that the cutting loads are reduced at a portion closer to the rearward portion of the body 10, thereby reducing the power required for cutting to improve the cutting performance substantially.

While the insert rotary cutting tools according to the present invention have been specifically shown and described herein, the invention itself is not to be restricted by the exact showings or the description thereof. For example, the number of the slots may be more than four or less than four. The plural groups of inserts may be disposed along helical lines having different helix angles from each other, and the helical lines may be such that they are arranged orderly in the circumferential direction so that the helix angles thereof are gradually increased. Further, the present invention may be applied to a face milling cutter or a side milling cutter.

What is claimed is:

1. An insert rotary cutting tool comprising:
a tool body of a generally circular cross-section having an axis of rotation therethrough and having an outer periphery; and
plural pairs of groups of cutting inserts releasably mounted on said outer periphery of said body with said groups being spaced circumferentially of said body from each other, said inserts of each group being displaced circumferentially of said body and spaced axially of said body, each of said inserts having a plurality of main cutting edges and being disposed in such a manner that one of said main cutting edges is indexed in a peripheral cutting position to serve as a peripheral cutting edge, said indexed peripheral cutting edges of said inserts of each group being in series axially of said body as viewed circumferentially of said body, said indexed peripheral cutting edges of said inserts of each group having foremost ends disposed on a common helical line extending helically axially of said body, each pair of said groups of said cutting edges being arranged such that said helical lines on which said foremost ends of said indexed main cutting edges of said inserts of said pair of groups are disposed in diametrically opposite relation and have the same helix angle, wherein each helical line of at least one of said pairs having a helix angle different from helix angles which the helical lines of the other pairs have, and said peripheral cutting edge of each of the inserts of at least one said group being provided with an axial rake angle different from axial rake angles of the other inserts of the same said insert group.

2. An insert rotary cutting tool according to claim 1, in which each helical line is sloping in a circumferential direction opposite to a direction of rotation of said body away from said forward end face.

3. An insert rotary cutting tool according to claim 1, in which each helical line is sloping in a direction of rotation of said body away from said forward end face.

4. An insert rotary cutting tool according to claim 1, in which said body includes a forward portion having a forward end face and a circumferential surface, said forward end having a plurality of slots formed in said circumferential surface in circumferentially spaced relation to one another, said slots opening to both said circumferential surface and said forward end face and having a wall surface facing in a circumferential direction opposite to a direction of rotation of said body, each slot having a plurality of recesses formed in said wall surface in generally axially spaced relation to each other, each recess opening to said circumferential surface with the one of said recesses closest to said forward end face in at least one said slot opening also to said forward end face, said inserts being releasably mounted in said recesses, respectively.

5. An insert rotary cutting tool according to claim 1, comprising first and second groups of cutting inserts disposed alternately in the circumferential direction of said body, said helical lines which said peripheral cutting edges of said inserts of said first group having foremost ends are disposed on being provided with said helix angle different from said helix angles of the helical lines which said peripheral cutting edges of said inserts of the second group are disposed on.

6. An insert rotary cutting tool according to claim 1, in which the closer to said forward end face the insert is disposed, the smaller axial rake angle the insert has.

* * * * *